United States Patent
Bowe et al.

(12)

(10) Patent No.: US 6,423,382 B1
(45) Date of Patent: Jul. 23, 2002

(54) METHOD OF COATING AN UNCURED MINERAL SUBSTRATE

(75) Inventors: Michael Damian Bowe, Newtown, PA (US); John Maxfield, Worthing (GB)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/448,114

(22) Filed: Nov. 24, 1999

(30) Foreign Application Priority Data

Dec. 5, 1998 (GB) .............................. 9826868

(51) Int. Cl.⁷ .............................. C08F 2/46; C08J 7/18; B05D 5/00; B05D 7/00
(52) U.S. Cl. ..................... 427/521; 427/494; 427/493; 427/544; 427/558; 427/559; 427/377; 427/393.6
(58) Field of Search ................................ 427/494, 512, 427/521, 522, 544, 557, 553, 558, 559, 377, 393.6, 493

(56) References Cited

U.S. PATENT DOCUMENTS

| | | |
|---|---|---|
| 3,870,546 A | 3/1975 | Gelsomino |
| 4,177,232 A | 12/1979 | Day |
| 4,789,319 A | 12/1988 | Garcia |
| 4,986,744 A | 1/1991 | Weisweiler et al. |
| 4,999,218 A | 3/1991 | Rehmer et al. |
| 5,017,320 A | 5/1991 | Garcia |
| 5,061,556 A | 10/1991 | Dotzauer et al. |
| 5,215,827 A | 6/1993 | Dotzauer et al. |

FOREIGN PATENT DOCUMENTS

| | | |
|---|---|---|
| DE | 4341260 | 12/1993 |
| EP | 0358949 | 3/1990 |
| JP | 57071884 A | 5/1982 |
| JP | 63256583 A | 10/1988 |

OTHER PUBLICATIONS

Translation of SHO 57–71884 supplied, no actual Japanese Patent Document Supplied.
Abstract SU–852840 Sep. 15, 1981.

*Primary Examiner*—Marianne L Padgett
(74) *Attorney, Agent, or Firm*—Karl Stauss

(57) ABSTRACT

A high gloss coating on a mineral substrate, such as a roof tile or floor tile, can be achieved by a method comprising:

i) applying a first coating consisting of an aqueous composition comprising a film forming polymeric binder to a surface of the uncured substrate;

ii) exposing said first coating to hot air or infrared, ultraviolet or microwave radiation, for sufficient time for at least the surface of said coating remote from the substrate body to form a film of polymeric binder, and iii) applying a second coating consisting of an aqueous composition comprising a film forming polymeric binder on top of the first coating. After application of the second coating, the substrate and coatings are dried and cured, for example in an oven or autoclave.

14 Claims, No Drawings

METHOD OF COATING AN UNCURED MINERAL SUBSTRATE

This invention is concerned with a method of coating an uncured mineral substrate. More particularly, though not exclusively, this invention concerns a method of coating an uncured cementitious substrate, such as a concrete roof, floor or wall tile or a concrete house siding, to give the substrate a high gloss finish.

Precast concrete roof tiles are typically produced from a concrete mortar whose consistency is such that it can be molded whilst in its green state into a design having features of shape, configuration, pattern or ornament which it will retain when cured. The tiles are usually formed of a layer or layers of green concrete molded to correspond to the desired surface appearance of the tiles. The tiles may be formed of a single layer of concrete or they may be formed of multiple layers of concrete, for example as disclosed in U.S. Pat. Nos. 4,789,319, 4,986,744 and 5,017,320.

Where a smooth finish on the upper surface of the tile is desired, the tile usually comprises at least two layers, the upper most layer being formed from a green concrete or cementitious slurry, comprising hydraulic cement, fine-grained aggregates, pigments and dispersing agents. This upper most layer has a thickness typically from 0.05 mm to no more than 3 mm and may be applied to the coarser base layer(s), for example, by a process such as described in any of the above US patents or by curtain coating the formed tile.

Concrete roof tiles tend to be susceptible to efflorescence when exposed to atmospheric moisture or precipitation. To suppress efflorescence in concrete roof tiles, it has been common practice to coat the upper side of the cured or uncured concrete roof tiles with an aqueous paint or clear coat composition which, when dry, provides a waterproof coating. Such aqueous paint compositions will typically comprise from 30 to 50% by weight of polymer dispersion, for example an aqueous, acrylate-based polymer dispersion, from 20 to 60% by weight fine inorganic filler, for example chalk, barytes and/or silica, and optionally from 2 to 10% by weight iron oxide pigment. Such aqueous clear coat compositions typically consist essentially of a 100% acrylic dispersion (e.g. 30–50% solids). Coatings formed from such paint and clear coat compositions tend to have a thickness on the tile of no greater than 0.15 mm. Improved efflorescence suppression has been proposed through the use of relatively more complex copolymer dispersions, such as those described in DE-A-4341260 and U.S. Pat. No. 5,215,827, as replacements in whole or in part for the more conventional simple acrylate-based polymer dispersions.

In U.S. Pat. No. 4,177,232 there is disclosed a method of making a concrete roof tile which has improved efflorescence resistance. In this method, a formed tile body is coated with a cementitious slurry and before that slurry layer has cured, an aqueous emulsion of a film forming polymeric material is applied thereto. The fully cured tiles formed by this method exhibit low gloss finishes It is often desirable for a concrete roof tile to exhibit a high gloss finish. A high gloss finish is typically obtained by a process of applying a coating of an aqueous clear coat composition to the uppermost surface of the tile after the tile has been dried and cured in an oven or autoclave, and then drying the coating. Alternatively, a high gloss finish may be obtained by a process of applying a coating of a non-aqueous clear coat composition to the uppermost surface of the tile either before or after the tile has been dried and cured.

It is an object of the present invention to provide a finished mineral substrate, such as a roof tile, which exhibits a high gloss finish but which has been manufactured by a method which either is quicker and potentially more energy efficient than previously known methods employing aqueous coatings or which does not rely upon the use of solvents used in non-aqueous coatings for making the same.

In accordance with the present invention, there is provided a method of coating a mineral substrate with at least one aqueous composition comprising a film forming polymeric binder, which method comprises the following sequential process steps:
 i) forming the body of said substrate from an uncured mineral composition, preferably a green concrete or fiber cement;
 ii) before drying and curing said body, coating a surface of said body with said at least one aqueous composition by:
  a) applying a first coating consisting of an aqueous composition comprising a film forming polymeric binder to said surface,
  b) exposing said first coating to hot air or infrared, ultraviolet or microwave radiation for sufficient time for at least the surface of said coating remote from the substrate body to form a film of polymeric binder, and
  c) applying a second coating consisting of an aqueous composition comprising a film forming polymeric binder on top of the first coating; and
 iii) drying and curing said body and said coatings, for example in an oven or autoclave.

In accordance with a second aspect of the present invention, there is provided a method of improving the gloss finish of a mineral substrate formed by a process comprising the following sequential process steps:
 i) forming the body of said substrate from an uncured mineral composition, preferably a green concrete or fiber cement,
 ii) before drying and curing said body, coating a surface of said body with said at least one aqueous composition by:
  a) applying a first coating consisting of an aqueous composition comprising a film forming polymeric binder to said surface, and
  b) exposing said first coating to hot air or infrared, ultraviolet or microwave radiation for sufficient time for at least the surface of said coating remote from the substrate body to form a film of polymeric binder, and
 iii) drying and curing said body and said coatings, for example in an oven or autoclave,
  wherein after process step ii) b) and before process step iii), a second coating consisting of an aqueous composition comprising a film forming polymeric binder is applied on top of the first coating.

Said second coating may be exposed to hot air or infrared, ultraviolet or microwave radiation before said substrate body and coatings are dried and cured, but it is preferred for the second coating to dry and cure without any such special pre-cure treatment.

Surprisingly, finished mineral substrates coated by the method of the present invention exhibit a high gloss finish which is comparable with finished substrates formed by conventional processes. The method of the present invention enables high gloss finished substrates to be manufactured quicker, and potentially in a more energy efficient manner, than similar finished substrates manufactured by conventional processes using aqueous coatings, where the second coating is applied to the substrate after the substrate body has been dried and cured.

Preferably, drying and curing of the mineral substrate and coatings is effected at a temperature of at least 4020 C.

The method of the present invention is preferably used to manufacture high gloss finishes on concrete substrates, most preferably on substrates such as concrete pipes, roof tiles, floor tiles, wall tiles and house sidings.

The uncured substrate body may be comprised of at least two superimposed layers of mortars of different compositions and characteristics. For example, such a process and apparatus for performing the process are described in U.S. Pat. No. 5,017,320 and U.S. Pat. No. 4,789,319, respectively. The apparatus disclosed in U.S. Pat. No. 4,986,744 may also be used for the manufacture of such multi-layered bodies. The layer of concrete which comprises the bottom surface of the body can be prepared by mixing a mortar composition to form a green concrete which is then extruded onto a continuous strand of moving bottom molds. Subsequently, if required, one or more other layers of green concrete or cementitious slurry, such as a colour coat, can be extruded or coated onto the first layer to form a multi-layered body of uncured mineral composition.

A surface of the uncured mineral substrate is coated as described in step ii) above with at least one aqueous composition comprising a film forming polymer. The aqueous composition used for the first coating may be the same or different from the aqueous composition used for the second coating. The film forming polymer used in the aqueous composition for the first coating may be the same as or different from the film forming polymer used in aqueous composition for the second coating.

The first coating may be an aqueous composition such as a cementitious slurry, a paint or a clear coat. The second coating may be an aqueous composition such as a cementitious slurry, a paint or a clear coat, though a paint or clear coat is preferred. The formulations of such coatings are well known in the art.

The film forming polymeric binder preferably has a minimum film forming temperature (MFT) of at least $-20°$ C., more preferably at least $0°$ C.

The film forming polymeric binder is preferably an organic polymer having a glass transition temperature (Tg) as measured by the Fox Equation of at least $-40°$ C., more preferably at least $-20°$ C., and most preferably at least $0°$ C. Preferably, the Tg of the polymeric binder is no more than $70°$ C., more preferably no more than $45°$ C.

The polymeric binder is preferably present in the aqueous composition in an amount of from 0.5 to 50% by weight polymer solids based on the total weight of said composition. More preferably, if the first coating is a cementitious slurry, the polymeric binder is present in an amount of from 0.5 to 10%, by weight polymer solids based on the total weight of said composition; or if the first coating is a paint or clear coat the polymeric binder is present in an a amount of from 20 to 50% by weight polymer solids based on the total weight of said composition. More preferably, if the second coating is a cementitious slurry, the polymeric binder is present in an amount of from 2 to 20%, by weight polymer solids based on the total weight of said composition; or if the second coating is a paint or clear coat the polymeric binder is present in an a amount of from 20 to 50% by weight polymer solids based on the total weight of said composition.

There are many commercially available organic polymer binders which are suitable for use in the present method. Such binders are commonly sold for use in paints and clear coats or sold for use as cement modifiers. Provided such polymers have a Tg of above $-40°$ C., it is believed they will be suitable.

Preferably the film forming polymer binder is from a polymer latex. The latex may be a dispersed polymer having its particles dispersed in an aqueous evaporable carrier, a water-reducible polymer, or a mixture thereof in the aqueous evaporable carrier. The aqueous evaporable carrier is preferably water but may be water having dissolved therein a water or polymer miscible organic solvent, such as methanol, ethanol or a glycol ether.

The polymeric binder may from be a latex emulsion or powder comprising a polymer polymerized from at least one or more of the following monomers:

acrylic and methacrylic acid esters such as methyl(meth)acrylate, ethyl(meth)acrylate, butyl(meth)acrylate, 2-ethylhexyl(meth)acrylate, decyl(meth)acrylate, lauryl(meth)acrylate, isobornyl(meth)acrylate, isodecyl(meth)acrylate, oleyl(meth)acrylate, palmityl(meth)acrylate, steryl(meth)acrylate, hydroxyethyl(meth)acrylate and hydroxypropyl(meth)acrylate; acid functional monomers such as acrylic acid, methacrylic acid, crotonic acid, fumaric acid and maleic acid; mono-methyl itaconate; mono-methyl fumarate; monobutyl fumarate; maleic anhydride; acrylamide or substituted acrylamides; diacetone acrylamide; glycidyl methacrylate; acetoacetoxyethylmethacrylate; acrolein and methacrolein; dicyclopentadienyl methacrylate; dimethyl meta-isopropenyl benzyl isocyanate; isocyanato ethyl methacrylate; methyl cellulose; hydroxyethyl cellulose; styrene or substituted styrenes; butadiene; ethylene; vinyl acetate or other vinyl esters; vinyl monomers such as vinyl chloride, vinylidene chloride, N-vinyl pyrrolidone; amino monomers such as N,N'-dimethylamino(meth)acrylate and acrylonitrile or methacrylonitrile. Most preferably, the latex comprises an acrylic polymer, a styrene/acrylic polymer, a styrene/butadiene polymer, a vinyl acetate/ethylene polymer, or polyvinyl acetate, or mixtures thereof. Other suitable polymers and specific examples of commercially available polymers are disclosed in U.S. Pat. No. 4,229,224. Example of commercially available cement modifiers suitable for use in the present invention include ACRONAL S400 available from BASF AG, DOW 460 available from Dow Chemical Company, RHOPLEX E-330, RHOPLEX MC-76 and RHOPLEX E-3083 available from Rohm and Haas Company, UCAR Latex 417 and Latex 429 available from Union Carbide Corp.). When the first or second coating is a cementitious slurry, the latex is generally stabilised by an anionic, cationic or nonionic surfactant in a conventional manner, though the use of a surfactant may also require the use of a defoamer for mixing in the concrete.

It will be appreciated that the polymeric binder may be derived from a monomer mix which is polymerized after the monomers have been incorporated into the composition. Examples of such monomers include organic monomers such as epoxy monomers and isocyanate monomers.

The first coating is exposed to hot air or infrared, ultra-violet or microwave radiation for sufficient time for at least the surface of the coating to form a film or "skin" of polymeric binder. Said film may be continuous over the entire surface of the coating or it may be co-continuous with the mineral particles in the substrate surface. Preferably, the coating is exposed to infrared, ultraviolet or microwave radiation. The second coating may be applied immediately after formation of the film.

Preferably, the mineral substrate is dried and cured immediately after the second coating is applied on top of the first coating.

The invention will now be more specifically described in terms of the following examples of some preferred embodiments which are given for the purposes of illustration only, and may be contrasted with the comparative tests also given below.

EXAMPLES

To assist further understanding of the present invention, but without wishing to be limited by it, the inventors' propose the following as a simplistic explanation of why they believe the advantages of the present invention may be obtained:

Cement slurry coatings, which may contain pigments, are currently used to give a smooth, attractive appearance to some building materials, e.g. concrete roof tiles. The external surface of these slurry coatings is usually sealed, for example with a polymeric clear coat, to minimizes the formation of efflorescence. When the polymeric clear coat is applied as a latex onto the wet slurry (pre-cure), efflorescence blocking is superior to post-cure application. However, pre-cure application gives a low gloss finish. To achieve a high gloss, a desirable trait on many roofs, a second coating of polymeric clear coat is applied post-cure. The present invention employs only pre-cure application of polymer, yet provides gloss comparable to a pre-cure plus post-cure process. This may be done in one of two ways:

A. If the uncured slurry is polymer modified, sealing the slurry surface can be achieved by a short burst of eg heat from an IR lamp. In the subsequent application of a polymeric clear coat, the clear coat and slurry do not mix and the clear coat substantially holds up above the surface of the slurry, drying to a glossy film;.

B. If the uncured slurry is not polymer modified, the slurry surface can be first sealed by application of some polymeric clear coat (even a single pass) to the unmodified slurry followed by a short burst of eg heat from an IR lamp. In the subsequent application of the remainder of the polymeric clear coat, the clear coat applied after IR treatment substantially holds up above the surface of the slurry, drying to a gloss film.

In both A and B, it is believed that film formation of polymer at or just beneath the slurry surface prevents the final clear coat from penetrating into the body of the slurry.

Note that this is substantially a surface effect and that, consequently, it is not essential to cause film formation of the polymer throughout the entire thickness of the first coating, whether said coating is a polymer modified slurry, paint or clear coat.

Also note that, in carrying out the methods of the present invention, the first coating of aqueous composition may be comprised of:

a) a polymer-free cementitious slurry base coat, and b) a film forming polymeric top coat.

WORKED EXAMPLES

In further support of the present invention, there are provided the following worked examples:

OPTICAL MEASUREMENTS

The L* values were measured using a Colorgard System 2000 colorimeter (available from BYK-Gardner Inc) based on a scale of 0=black to 100=white. Thus, darker colored tiles have lower values of L*, indicative of reduced efflorescence.

Specular gloss values were measured at 60° on a BYK Labotron in accordance with ASTM D 5231-89. The higher the 60 Gloss value, the higher the gloss of the surface.

Example I
Preparation of Control Base Plates.

A green concrete was made by mixing the following ingredients in a conventional manner:

| Ingredient | Parts by weight |
| --- | --- |
| #45 mesh (0.355 mm) builders sand | 300 |
| Type I Portland Cement | 100 |
| Water | 41 |

Round test base plates were made by hand packing 170 g of the green concrete into 90 mm petri dishes. The resulting patties were 13 mm thick.

Example II
Preparation of Aqueous Cementitious Slurries

Aqueous cementitious slurries were formed by mixing the following components in a conventional manner.

|  | A | B |
| --- | --- | --- |
| cement, type I | 100 g | 100 g |
| #100 sand | 50 g | 50 g |
| Bayferrox 318-M | 8 g | 8 g |
| Rhoplex MC-76 | — | 12.8 g (6.0 g solids) |
| additional water | 48 g | 29.2 g |
| calc. w/c | 0.48 | 0.36 |

Bayferrox 318-M is a black iron oxide pigment available from Bayer AG. Rhoplex MC 76 is a commercially available acrylic latex polymer (47% solids) having an MFT of 12° C., a Tg of 15° C., and an average particle size of 180 nm from Rohm and Haas Company The dry ingredients were mixed for one minute, then the combined latex and water were added followed by 2 additional minutes of mixing.

Example III
Preparation of Uncured Test Tiles (Control)

Uncured test tiles were prepared by pouring slurry A onto a control base plate and spreading the slurry by tipping the sample and allowing the slurry to run to the edges. Gentle shaking gave a smooth surface. Enough slurry was used to give an average thickness of 0.5 mm over the uppermost surface of the control base plate.

Example IV
Coating Uncured Test Tiles

Control test tiles formed in Example III were coated, as described in Table 1 below, with a commercially available aqueous clear coat composition consisting of a 100% butyl acrylate/methyl methacrylatecopolymer dispersion (42% solids, MFT 22° C., Tg 26° C.). The composition was sprayed onto the uppermost surface of the slurry in a total of 4 passes, each of about 15 microns. IR radiation surface heating of the coatings, as described in Table 1, was provided by quartz lamps located 15 cm above the substrate, at a power flux of 60 kWm$^{-2}$. Temperature reported in Table 1 is that reached at the end of the heating period. After coating, the uncured tiles were passed into an oven to be cured at 50° C. (100% Relative Humidity) for 4 hours and then dried at 50° C. (ambient Relative Humidity).

After the cured and dried test tiles had cooled to room temperature, the L* and 60° gloss values were measure. The results are detailed in Table 1.

TABLE 1

| treatment | L* | 60° gloss |
|---|---|---|
| 1. no coating | 41 | 1.7 |
| 2. no IR; 4 passes of coating | 29.2 | 3.8 |
| 3. IR 30 sec/68° C. then 4 passes of coating | 26.9 | 6.6 |
| 4. IR 50 sec/79° C. then 4 passes of coating | 29.3 | 10.4 |
| 5. 4 passes of coating then IR 20 sec/65° C. | 28.2 | 4.5 |
| 6. 1 pass of coating then IR 30 sec/76° C. then 3 passes of coating (invention) | 26.0 | 18.8 |

The coating reduces efflorescence in all cases. IR treatment of the slurry surface before or after application of all the coating gives some gloss improvement. Applying the coating in accordance with the present invention (procedure 6) gives significant improvement in gloss.

Example V
Preparation of Tiles Coated with Polymer Modified Slurry and Clear Coat Uncured bases plates, formed in Example I, were coated with aqueous cementitious slurry B, formed in Example II, by pouring the slurry onto the plate and spreading the slurry by tipping the sample and allowing the slurry to run to the edges. Gentle shaking gave a smooth surface. Enough slurry was used to give an average thickness of 0.5 mm over the uppermost surface of the base plate.

The slurry was then coated, as described in Table 2 below, with a commercially available aqueous clear coat composition consisting of a 100% butyl acrylate/methyl methacrylate copolymer dispersion (42% solids, MFT 22° C., Tg 26° C.). The composition was sprayed onto the uppermost surface of the slurry in a total of 5 passes, each of about 15 microns to produce a targeted final film thickness of 30 to 40 microns. IR radiation surface heating, as described in Table 2, was provided by quartz lamps located 15 cm above the substrate, at a power flux of 60 kWm$^{-2}$. Temperature reported in Table 2 is that reached at the end of the heating period.

After coating, the uncured tiles were passed into an oven to be cured at 50° C. (100% Relative Humidity) for 4 hours and then dried at 50° C. (ambient Relative Humidity).

After the cured and dried test tiles had cooled to room temperature, the L* and 60° gloss values were measure. The results are detailed in Table 4.

TABLE 2

| treatment | L* | 60° gloss |
|---|---|---|
| 1. no clear coat | 48.9 | 2.2 |
| 2. no IR; 5 passes ofclear cQat | 35.5 | 4.7 |
| 3. IR 20 sec/59° C.; 5 passes of clear coat (invention) | 32.9 | 19.6 |
| 4. IR 30 sec/67° C.; 5 passes of clear coat (invention) | 32.0 | 20.7 |
| 5. 5 passes of clear coat; IR 20 sec/60° C. | 31.2 | 4.4 |

In all cases the clear coat greatly reduced efflorescence, as indicated by lower L*. However, in procedures 3 and 4, when the surface of the first coating, the slurry, was thermally exposed to IR radiation, and then the second coating, the clear coat, applied, significant improvements in gloss are achieved.

We claim:

1. A method of coating an uncured cementitious substrate comprising the following sequential steps:

i) forming a body of said substrate from an uncured cementitious composition, ii) before drying and curing said body, coating a surface of said body by:

a) applying a first coating comprising at least one aqueous composition comprising a film forming polymeric binder to said surface, b) exposing said first coating to infrared radiation for less than about one (1) minute for at least the exposed surface of said first coating to form a film of polymeric binder, and c) applying a second coating consisting of an aqueous composition comprising a film forming polymeric binder on top of the first coating; and iii) drying and curing the combined body, first coating and second coating.

2. A method as claimed in claim 1, wherein said first coating is a paint, clear coat or cementitious slurry.

3. A method as claimed in claim 1, wherein said second coating is a paint, clear coat or cementitious slurry.

4. A method as claimed in claim 1, wherein the film forming polymer used in the first coating has a minimum film forming temperature of at least −20° C.

5. A method as claimed in claim 1, wherein said film forming polymer used in the first coating has a minimum film forming temperature of at least −20° C. and has a Tg in the range of from −40° C. to 70° C.

6. A method as claimed in claim 4, wherein said polymeric binder is polymerized from at least one or more of the following monomers: acrylic and methacrylic acid esters such as methyl(meth)acrylate, ethyl(meth)acrylate, butyl (meth)acrylate, 2-ethylhexyl(meth)acrylate, decyl(meth) acrylate, lauryl(meth)acrylate, isoboryl(meth)acrylate, isodecyl(meth)acrylate, oleyl(meth)acrylate, palmityl(meth) acrylate, steryl(meth)acrylate, hydroxyethyl(meth)acrylate and hydroxypropyl(meth)acrylate; acid functional monomers such as acrylic acid, methacrylic acid, crotonic acid, fumaric acid and maleic acid; mono-methyl itaconate; mono-methyl fumarate; monobutyl fumarate; maleic anhydride; acrylamide or substituted acrylamides; diacetone acrylamide; glycidyl methacrylate; acetoacetoxyethyl-methacrylate; acrolein and methacrolein; dicyclopentadienyl methacrylate; dimethyl meta-isopropenyl benzyl isocyanate; isocyanato ethyl methacrylate; methyl cellulose; hydroxyethyl cellulose; styrene or substituted styrenes; butadiene; ethylene; vinyl acetate or other vinyl esters; vinyl monomers such as vinyl chloride, vinylidene chloride, N-vinyl pyrrolidone; amino monomers such as N,N'-dimethylamino(meth)acrylate and acrylonitrile or methacrylonitrile.

7. A method as claimed in claim 4, wherein the film forming polymer is selected from the group consisting of an acrylic polymer, a styrene/acrylic polymer, a styrene/butadiene polymer, a vinyl acetate/ethylene polymer, or polyvinyl acetate, and mixtures thereof.

8. A method as claimed in claim 1, wherein said body of said substrate formed in step i) comprises at least one layer from the group consisting of green concrete and fiber cement.

9. A method as claimed in claim 8, wherein said body of said substrate formed in step i) further comprises at least one layer of cementitious slurry.

10. A method as claimed in claim 1, wherein the first coating of aqueous composition is comprised of:

a) a polymer-free cementitious slurry base coat, and b) a film forming polymeric binder top coat.

11. A method as claimed in claim 2, wherein said second coating is a paint, clear coat or cementitious slurry.

12. A method as claimed in claim 1, wherein the film forming polymer used in the second coating has a minimum film forming temperature of at least −20° C.

13. A method as claimed claim 1, wherein said film forming polymer used in the second coating has a minimum film forming temperature of at least −20° C. and has a Tg in the range of from −40° C. to 70° C.

14. A method as claimed in claim 5, wherein said polymeric binder is polymerized from at least one or more of the following monomers: acrylic and methacrylic acid esters such as methyl(meth)acrylate, ethyl(meth)acrylate, butyl (meth)acrylate, 2-ethylhexyl(meth)acrylate, decyl(meth) acrylate, lauryl(meth)acrylate, isobornyl(meth)acrylate, isodecyl(meth)acrylate, oleyl(meth)acrylate, palmityl(meth) acrylate, steryl(meth)acrylate, hydroxyethyl(meth)acrylate and hydroxypropyl(meth)acrylate; acid functional monomers such as acrylic acid, methacrylic acid, crotonic acid, fumaric acid and maleic acid; mono-methyl itaconate; mono-methyl fumarate; monobutyl fumarate; maleic anhydride; acrylamide or substituted acrylamides; diacetone acrylamide; glycidyl methacrylate; acetoacetoxyethylmethacrylate; acrolein and methacrolein; dicyclopentadienyl methacrylate; dimethyl meta-isopropenyl benzyl isocyanate; isocyanato ethyl methacrylate; methyl cellulose; hydroxyethyl cellulose; styrene or substituted styrenes; butadiene; ethylene; vinyl acetate or other vinyl esters; vinyl monomers such as vinyl chloride, vinylidene chloride, N-vinyl pyrrolidone; amino monomers such as N,N'-dimethylamino(meth)acrylate and acrylonitrile or methacrylonitrile.

* * * * *